United States Patent [19]

Obata et al.

[11] Patent Number: 5,018,082
[45] Date of Patent: May 21, 1991

[54] GUIDANCE MESSAGE DISPLAY TIMING CONTROL USING TIME INTERVALS

[75] Inventors: Akihiko Obata, Mitaka, Japan; Motomitsu Adachi, Bedminister, N.J.; Hajime Kamata, Kawasaki; Katsutoshi Yano, Tokyo, both of Japan

[73] Assignee: Fujitsu Limited, Kawasaki, Japan

[21] Appl. No.: 518,246

[22] Filed: May 7, 1990

Related U.S. Application Data

[63] Continuation of Ser. No. 198,090, May 24, 1988, abandoned.

[30] Foreign Application Priority Data

May 25, 1987 [JP] Japan ................................ 62-125763

[51] Int. Cl.⁵ .......................... G06F 15/18; G09B 7/04
[52] U.S. Cl. ..................................... 364/521; 434/118; 434/335
[58] Field of Search ............... 434/118, 335, 219, 322, 434/344, 307; 364/521

[56] References Cited

U.S. PATENT DOCUMENTS

| | | | |
|---|---|---|---|
| 4,052,798 | 10/1977 | Tomita et al. | 434/336 |
| 4,114,294 | 9/1978 | Marmer | 434/201 |
| 4,571,682 | 2/1986 | Silverman et al. | 364/413.04 |
| 4,611,996 | 9/1986 | Stoner | 434/201 |
| 4,637,797 | 1/1987 | Whitney et al. | 434/118 |
| 4,772,206 | 9/1988 | Kerr et al. | 434/118 |

FOREIGN PATENT DOCUMENTS 186922 9/1985 Japan .
243517 10/1985 Japan .
263256 12/1985 Japan .

OTHER PUBLICATIONS

European Search Report for EP 88-10-8322, The Hague, 2/12/90.

Primary Examiner—Gary V. Harkcom
Assistant Examiner—Raymond I. Bayerl
Attorney, Agent, or Firm—Staas & Halsey

[57] ABSTRACT

A guidance message display control system for displaying a guidance message on terminal equipment, such as multi-media communication terminals. The system maintains and updates a skill level which corresponds to the length of delay occuring before the display of the guidance message. The system awaits a choice selection by a users. If within a predetermined time delay the user has not input a valid selection, then the guidance message is displayed and the skill level is decreased. On the other hand, if a valid selection is made within the predetermined period, then the skill level is increased. Thus, guidance messages are displayed based upon user skill. That is, the messages appear for the unskilled user, but only appear as needed for the skilled user.

15 Claims, 16 Drawing Sheets

Fig.11

| STATUS NUMBER | COORDINATE | ORDINATE | ABSCISSA | ICON NUMBER |
|---|---|---|---|---|
| $S_0$ | $(X_0, Y_0)$ | $H_0$ | $W_0$ | $I_0$ |
| | $(X_1, Y_1)$ | $H_1$ | $W_1$ | $I_1$ |
| | ⋮ | ⋮ | ⋮ | ⋮ |
| | $(X_n, Y_n)$ | $H_n$ | $W_n$ | $I_n$ |
| $S_1$ | $(X_0', Y_0')$ | $H_0'$ | $W_0'$ | $I_0'$ |
| | ⋮ | ⋮ | ⋮ | ⋮ |

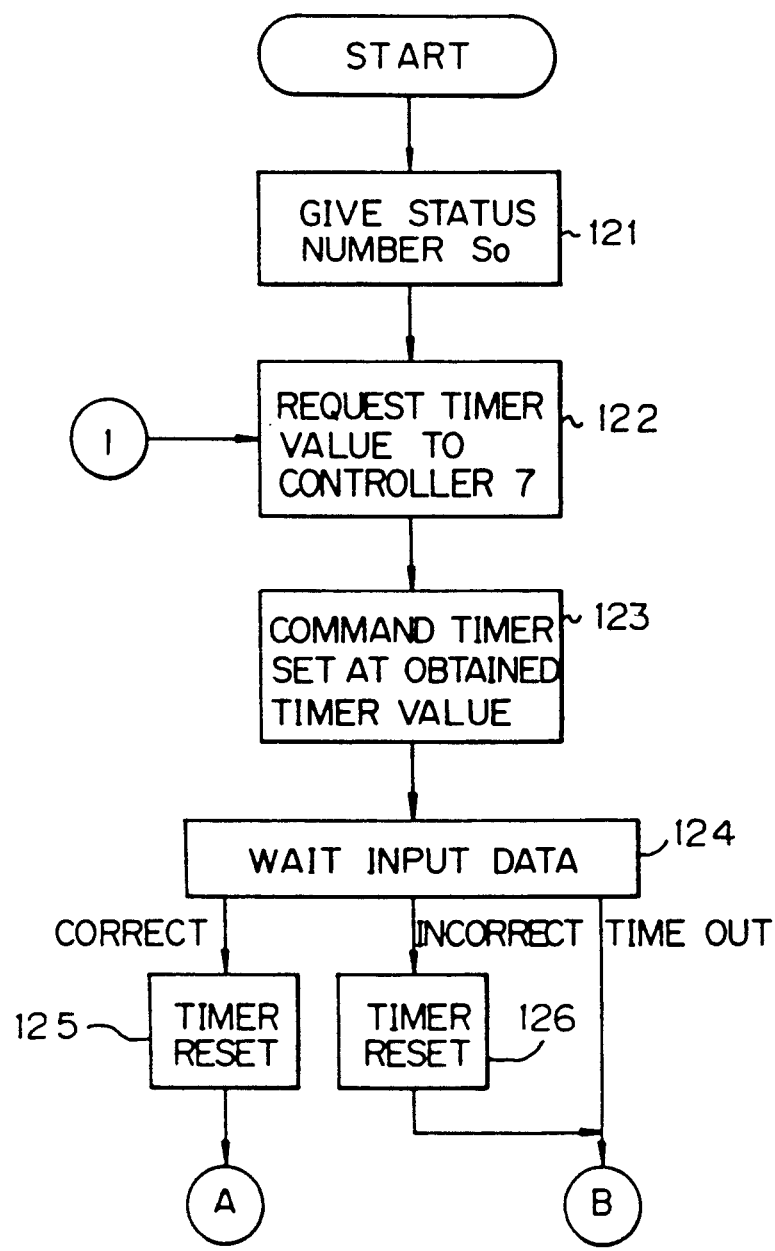

Fig.13

| STATUS NUMBER | ICON NUMBER | RUNNING APPLICATION | NEXT STATUS |
|---|---|---|---|
| $S_0$ | $I_0$ | $A_0$ | $S_{n0}$ |
|  | $I_1$ | $A_1$ | $S_{n1}$ |
|  | ⋮ | ⋮ | ⋮ |
|  | $I_n$ | $A_n$ | $S_{nn}$ |
| $S_1$ |  |  |  |
| ⋮ | ⋮ | ⋮ | ⋮ |

Fig.15

| STATUS NUMBER | SKILL LEVEL | LEARNING CURVE | GUIDANCE MESSAGE | NUMBER OF LETTER |
|---|---|---|---|---|
| $S_0$ | $S_{k0}$ | $f_0$ | $G_0$ | $g_0$ |
| $S_1$ | $S_{k1}$ | $f_1$ | $G_1$ | $g_1$ |
| ⋮ | ⋮ | ⋮ | ⋮ | ⋮ |

GUIDANCE MESSAGE DISPLAY TIMING CONTROL USING TIME INTERVALS

This is a continuation of co-pending application Ser. No. 07/198,090 filed on May 24, 1988 now abandoned.

BACKGROUND OF THE INVENTION

1. Field of the Invention

The present invention relates to a guidance message display control system, more particularly, it relates to a method for controlling a display timing of a guidance message displayed on a terminal equipment (hereinafter referred to as the terminal) used as a multi-media communication terminal.

2. Description of the Related Art

A multi-media communication system, for example, an ISDN (Integrated Services Digital Network) and a LAN (Local Area Network), is a high grade communication services network constituted by computers, optical fiber cables and digital signals, together with a communication satellite. In this system, many terminals are provided for transferring various information necessary for inter-communication among subscribers, and such a terminal has many functions, for example, telephone, facsimile, telex, and the like. These functions are displayed on the display device of the terminal together with guidance messages.

The guidance messages usually denote procedures for operating the keyboard of the terminal, and the user operates the keyboard step by step in accordance with the displayed guidance messages. In this case, it is important that high grade functions, for example, high speed and huge data communication functions be provided in the multi-media communication system. Therefore, recently intensive research has been carried out into the development of a "man-machine interface". The man-machine interface is intended to provide any number of functions between a human (user) and a machine (terminal). One of the problems of the man-machine interface is the user's skill level when using the terminal, since each user's skill level is different in accordance with the user's experience. Therefore, the display timing of the guidance messages must be geared to the user's skill level.

Terminals having control functions operating in accordance with the user's skill level have been disclosed, in, for example, Japanese Examined Patent Publication No. 60-263256, and Japanese Unexamined Patent Publications No. 60-95625 and No. 60-186922.

The first reference (No. 60-263256) discloses a computer system having control functions operating in accordance with the user's skill level. In this system, before operating the computer system, the user inputs a message denoting the skill level of the user and performs the necessary steps in accordance with the guidance displayed on the display device. Although this system is based on the frequency of use of the computer by the user, often this frequency of use does not reflect the actual skill level of the user. This is because the change of skill level at each step is not input for evaluation. The second reference (No. 60-95625) also discloses a computer system having control functions operating in accordance with the user's skill level. This system is based on data of previous use by the user, and the display speed of the guidance message is based on this data. The third reference (No. 60-186922) discloses a method for outputting the guidance message. This method is based on the time elapsing between key-in operations by the user. In this method, the grade of the content of the guidance is changed in accordance with the change of the elapsed time, but the same problems as that of the first reference still arise in this system.

SUMMARY OF THE INVENTION

The object of the present invention is to provide a guidance message display control system in a terminal having an improved user's skill level control function.

In accordance with the present invention, there is provided a guidance message display control system for terminal equipment including an input unit, a display unit and a display control unit. The display control unit including: an input data analyzing device operatively connected to the input unit for analyzing input data based on a coordinate control table stored in a main memory; a status control device operatively connected to the input data analyzing device for controlling a display timing on the display unit based on a status control table stored in the main memory; a timer device operatively connected to the status control device for counting the time elapsed and a guidance interval at every input execution step; a skill control device operatively connected to the status control device for controlling the user's skill level so as to increase or decrease the speed of each input execution step in accordance with the time elapsed, guidance display interval and correctness of the input operation, based on a skill control table stored in the main memory; and a display control device operatively connected between the status control device and the display unit, for controlling the display state of the guidance message on the display unit; wherein the display timing of the guidance message on the display unit is controlled in such a way that the display control unit repeatedly performs each input execution step, including analyzation of the input data, control of the user's skill level, count of the time elapsed, and control of the display state of the guidance message.

BRIEF DESCRIPTION OF THE DRAWINGS

In the drawings:

FIG. 11 is a coordinate table for controlling input data;

FIGS. 12A to 12C are flowcharts for explaining the operation of the status controller in FIG. 1;

FIG. 13 is a status control table;

FIG. 15 is a skill control table.

DESCRIPTION OF THE PREFERRED EMBODIMENTS

Before describing the preferred embodiments, an explanation will be given of the problems arising in conventional methods for controlling the output timing of a guidance message.

Figure 3:
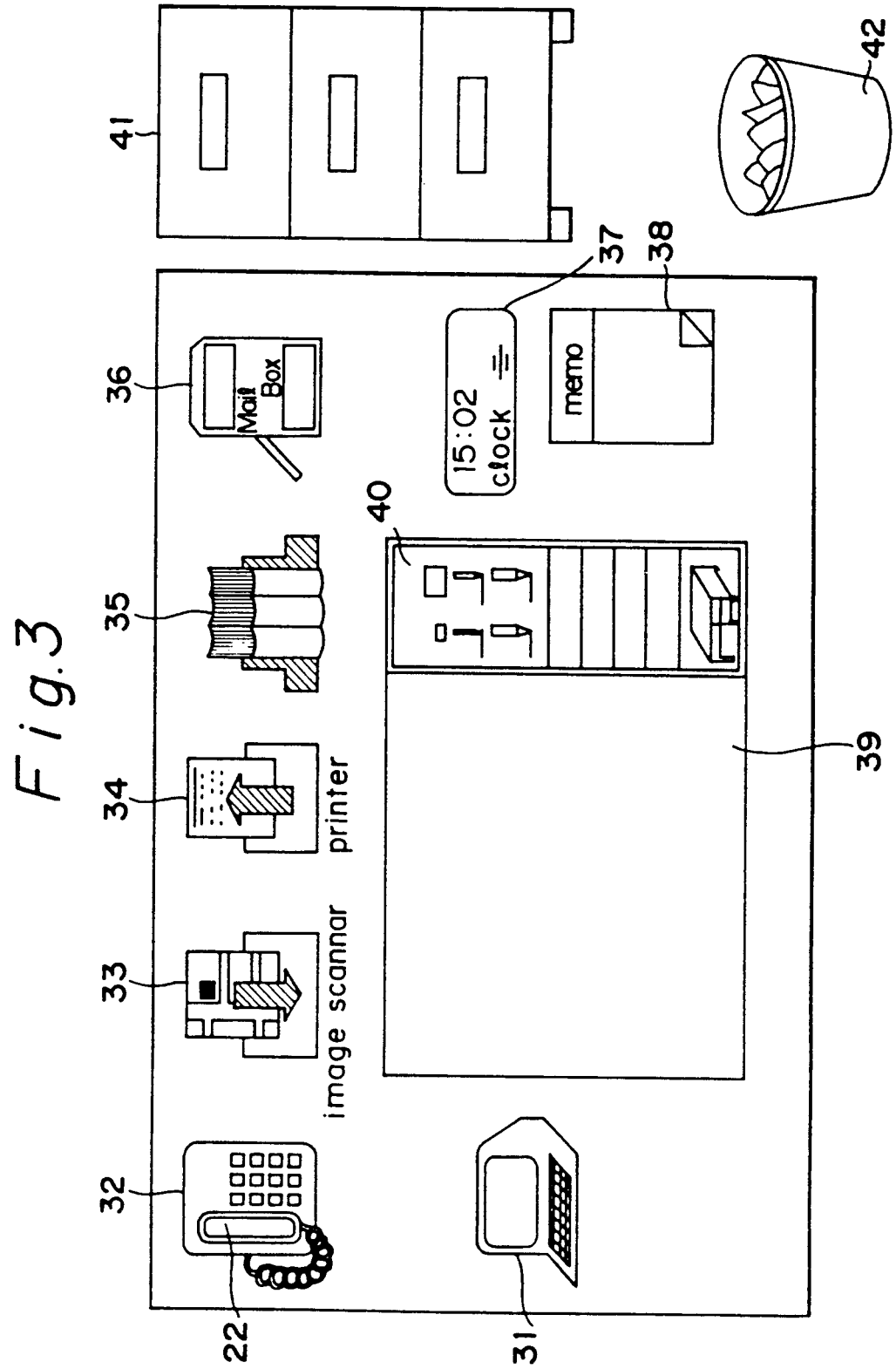
FIGS. 3 to 5 illustrate various icons and guidance messages displayed on a screen.
Figure 4:
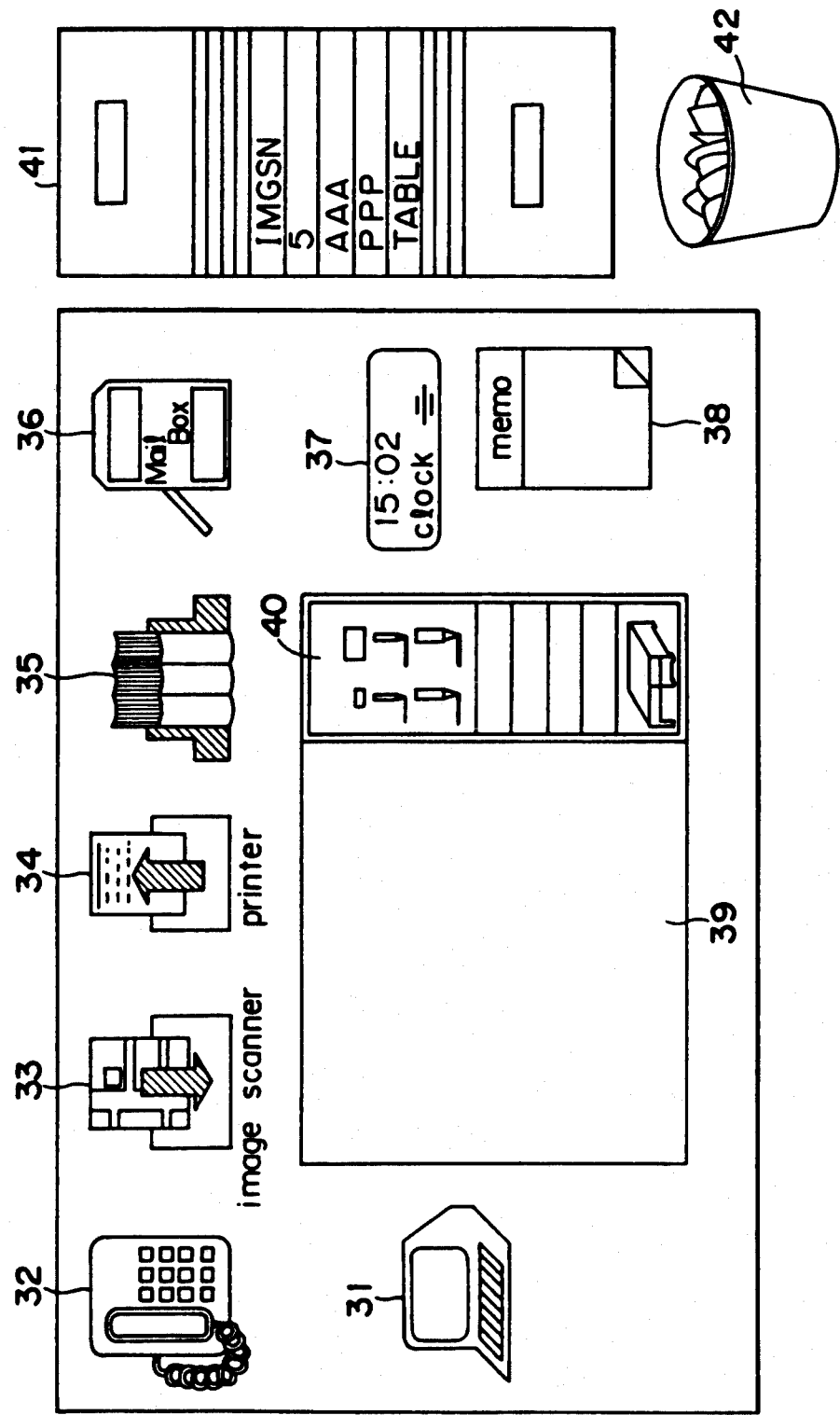
Figure 5:
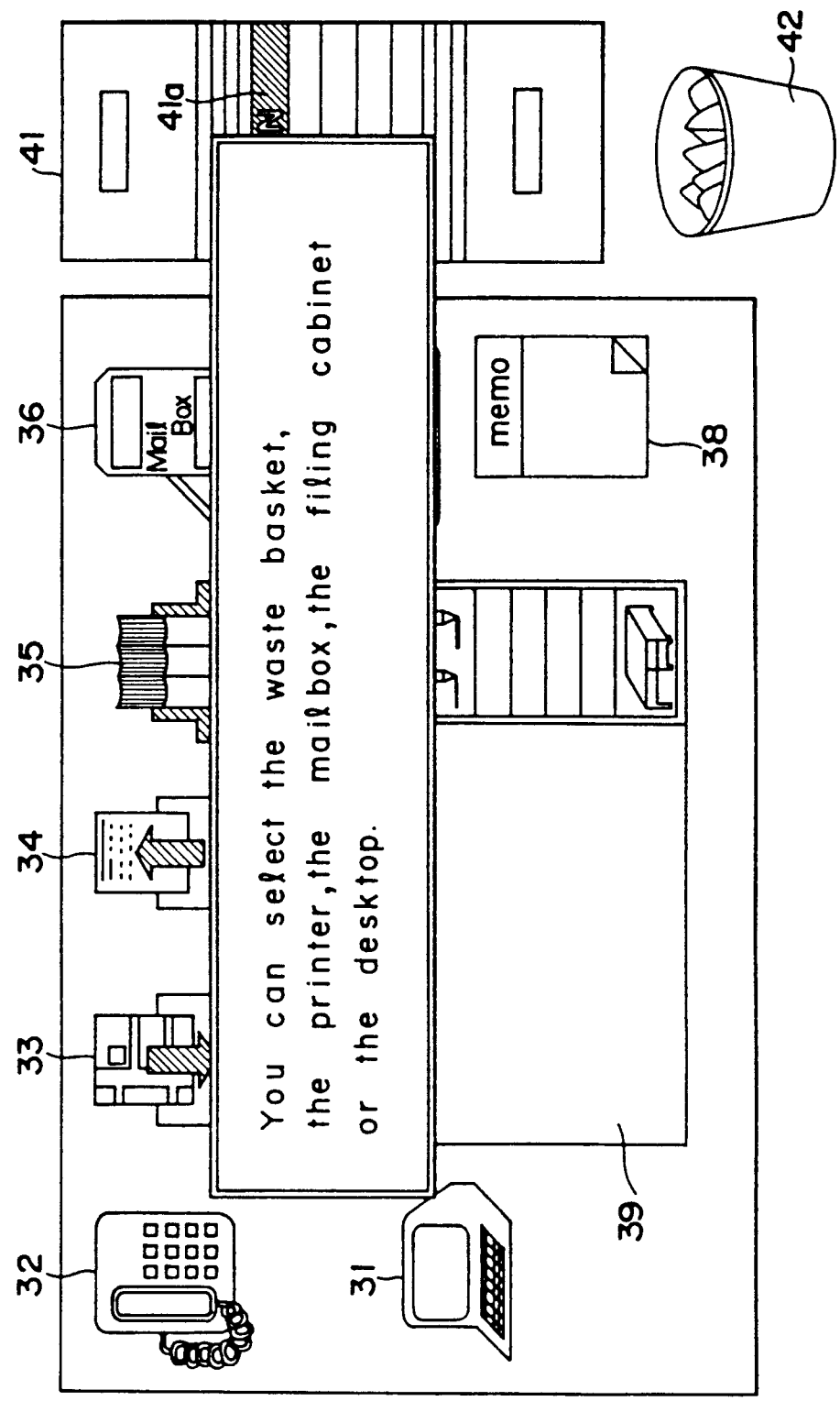

In the terminal, many kinds of guidance messages and icons are displayed pictorially on the screen, as shown in FIGS. 3 to 5. Each of the pictures is called an "icon" and each icon denotes a telephone, an image scanner, a printer, a calculator, a mail box, a black board, and the like. The user initially selects, for example, the telephone icon, with the electric probe, and then the guidance messages are displayed on the screen. In this step, when the user cannot understand the guidance message, the user usually must read the instruction manual or push the keyboard button (key-in operation) generating a "help command". The unskilled user usually must take the above steps, and thus must make many access operations before being able to increase the skill level.

The skilled user, however, can operate the keyboard without the necessity for a display of a guidance message at every step. Therefore, although a display of a guidance message at every step is helpful for the unskilled user, it is irritating for a skilled user, since such a user must wait until the next guidance message is displayed. Accordingly, to eliminate the above problem, the guidance message should be displayed in accordance with the user's skill level.

A method for controlling the output timing of the guidance message displayed on the screen will be explained in detail hereinafter.

Figure 1:
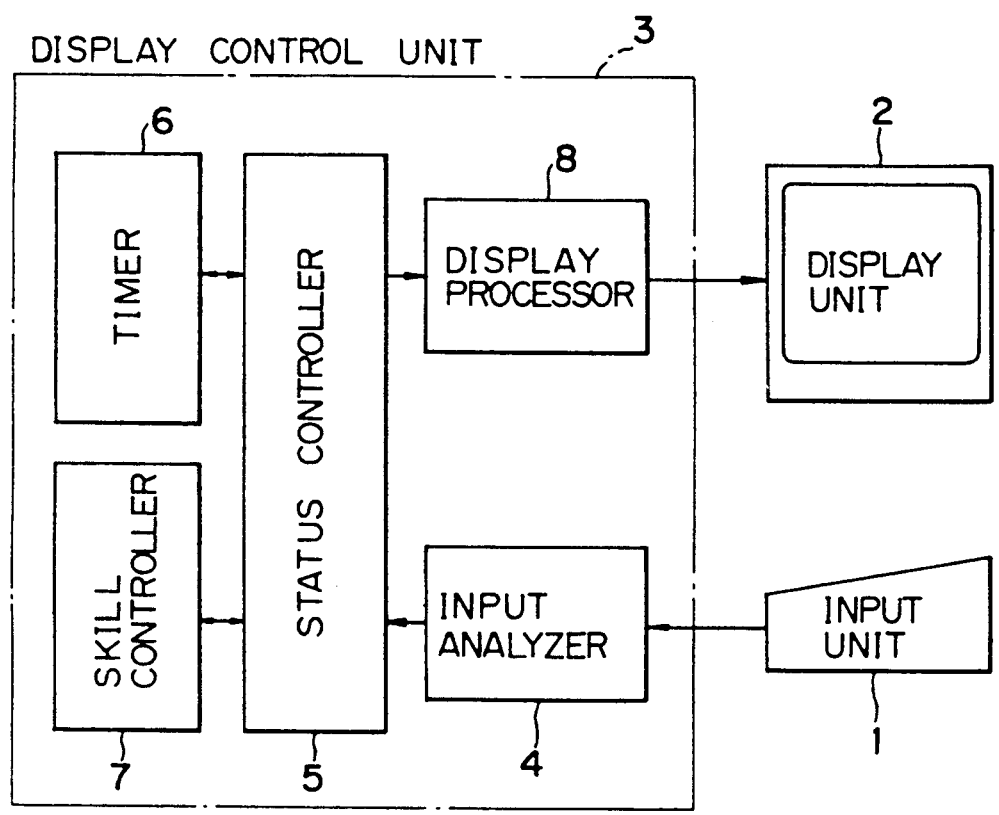
FIG. 1 is a basic block diagram of a terminal used in a multi-media communication system according to the present invention.

FIG. 1 shows a basic structure of the guidance message display control system of a terminal used in the multi-media communication system according to the present invention.

In FIG. 1, reference number 1 denotes an input unit, for example, a keyboard, 2 a display unit for displaying the various guidance messages, and 3 a display control unit. The display control unit 3 is constituted by an input analyzer 4 for analyzing the input information, a status controller 5 for controlling the display status on the screen, a timer 6 for measuring the time elapsed and setting a guidance interval, a skill controller 7 for controlling the user's skill level, and a display processor 8 for controlling the display of the guidance message on the screen.

In this structure, the user operates the keyboard 1 (key-in operation), and the input execution steps are repeated by the display control unit 3 in accordance with the input operation of the user, based on the guidance message displayed on the display device 2. The timer 6 detects the time interval between one input execution step and the next, and the skill controller 7 detects the user's skill level based on the time interval and the correctness of each input operation of the user, and controls the timing of the display of the guidance message in response to the detected skill level. In this case, the timer 6 decides the time for displaying the next guidance message, and the skill controller 7 changes the user's skill level based on the time set by the timer 6. Therefore, when the next input operation is correctly performed by the user within the set time, the skill controller 7 increments the skill level by one. When the input operation is not performed within the set time, or the input operation is incorrectly performed, the skill controller 7 decrements the skill level by one. For example, when the user's skill level is high, the display timing of the next guidance message is delayed to enable the user to proceed to the next operation before displaying the next guidance message. Therefore, since it is not necessary to display unwanted guidance for the user, it is possible to increase the processing speed of the terminal. On the other hand, when the user's skill level is low, the display timing is made faster so that the user can be guided to the next step, at every step.

Figure 2:
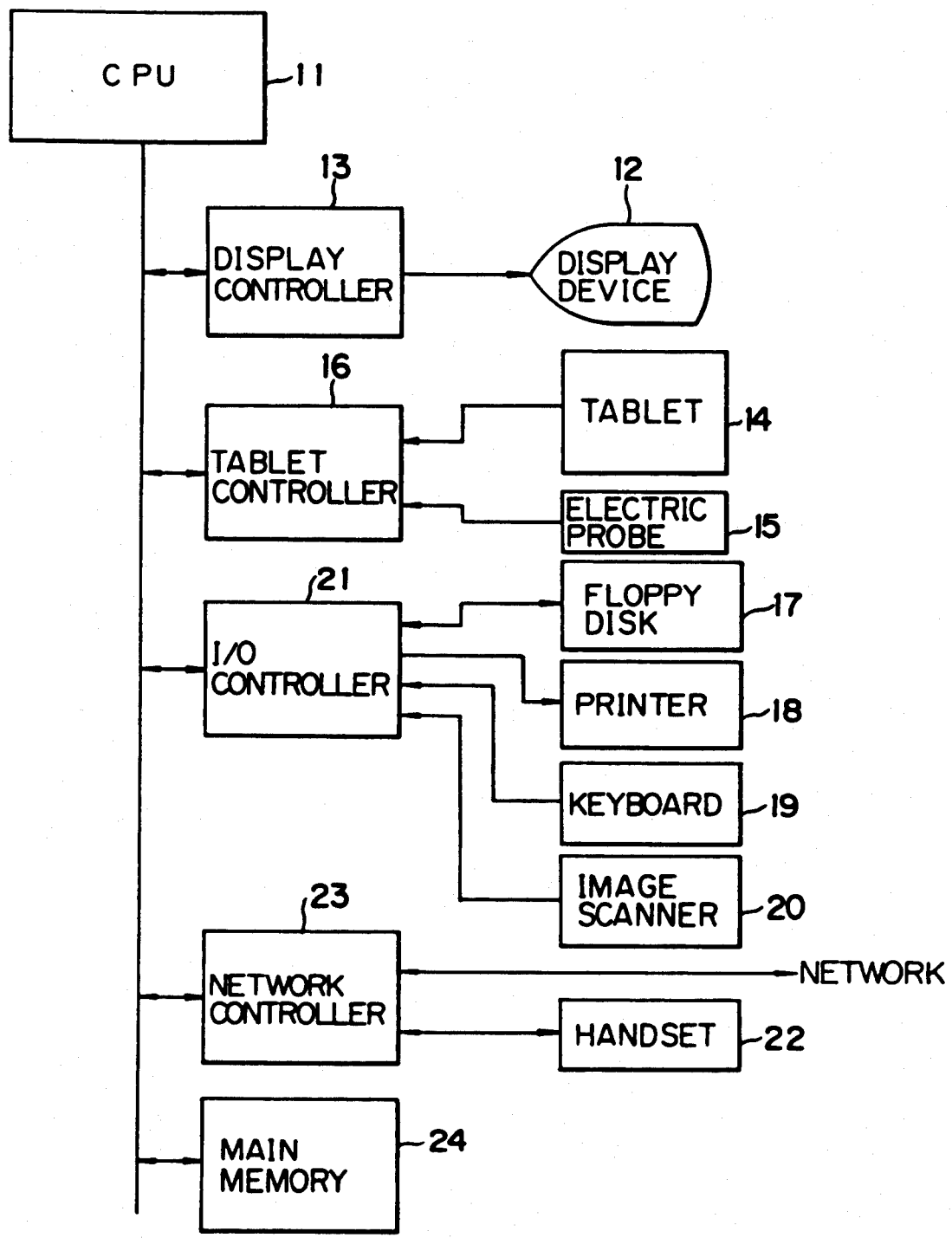
FIG. 2 is a schematic block diagram of the terminal shown in FIG. 1.

FIG. 2 shows a schematic block diagram of the terminal according to an embodiment of the present invention.

In FIG. 2, reference number 11 denotes a central processing unit (CPU), 12 a display device, 13 a display controller, 14 a tablet mounted on the display device 12, 15 an electric probe for selecting the icon on the tablet 14, 16 a tablet controller, 17 a floppy disk, 18 a printer, 19 a keyboard, 20 an image scanner, 21 an input/output (I/0) controller, 22 a handset, 23 a network controller, and 24 a main memory. The display control unit 3 in FIG. 1 corresponds to the CPU 11 having the input analyzing function, the status controlling function, the time setting function, the skill level controlling function, and the display controlling function. The input unit 1 in FIG. 1 corresponds to the tablet 14 and the electric probe 15.

The tablet 14 is mounted on the display device and is constituted by a transparent board having a plurality of electrodes arranged in a matrix at a very high density. The user can see the icon and the guidance message on the display device through the tablet, and the desired icon can be selected by touching the electric probe to the tablet. The various guidance messages are stored in the main memory 24 and read out by the CPU 11, and then displayed on the display device 12 through the display controller 13.

FIGS. 3 to 5 show various icons and guidance messages displayed on the screen.

In FIGS. 3 to 5, each of the icons has following meaning. Namely, 31 is a terminal, 32 is a telephone, 33 is an image scanner, 34 is a printer, 35 is a bookshelf, 36 is a mail box, 37 is a clock, 38 is a memorandom paper, 39 is a desktop, 40 is a pencil box, 41 is a file cabinet, and 42 is a waste basket.

In FIG. 3, these icons are initially displayed on the screen and the operator selects one of the icons by using the electric probe (hereinafter, electric pencil). For example, when the operator selects the icon 31, the terminal function is selected, and when the operator selects the icon 32, the telecommunication function is selected. In this selection, a multi-functions telephone board having dial keys, pending buttons, transfer buttons and the like are displayed on the screen, and thus the operator can communicate with other terminals through the handset 22. When the operator selects the icon 33, documents can be input through the image scanner 20, and when the operator selects the icon 34, the documents can be printed by the printer 18.

When the operator selects the icon 35, the operation phase is switched to the access phase, to access a data base such as a telephone directory, schedule table, and the like, and when the operator selects the icon 36, the execution step is switched to the access phase in which documents are transferred by electric mail. When the operator selects the icon 37, the operation phase is switched to the clock, and when the operator selects the icon 38, the operation phase is switched to the blank paper and the operator can write information on the memo 38. When the operator selects the icon 39, the documents are displayed on the desktop and the operation phase is switched to the editing phase when the operator touches the icon 40. When the operator selects the icon 41, the documents in the cabinet 41 are displayed on the screen, and when the operator selects the icon 42, the documents are erased after the operator touches the waste basket 42.

In FIG. 4, this display indicates the case wherein the operator has selected the middle drawer of the file cabinet 41. The contents are displayed on the desktop 39 after touching the middle drawer, and the documents can be saved in the drawer when the operator touches the drawer after touching the documents.

FIG. 5 shows one example of the guidance messages. When the operator selects "IMGSN" in the middle drawer shown in FIG. 4, the "IMGSN" image is displayed on the drawer as shown by the number 41a. In this case, when the operator does not perform the next input operation before the set time has lapsed, the guidance message shown in FIG. 5 is displayed on the screen. This guidance message can be moved to any optional position on the screen to prevent obstruction of the operator's next operation.

Figure 6:
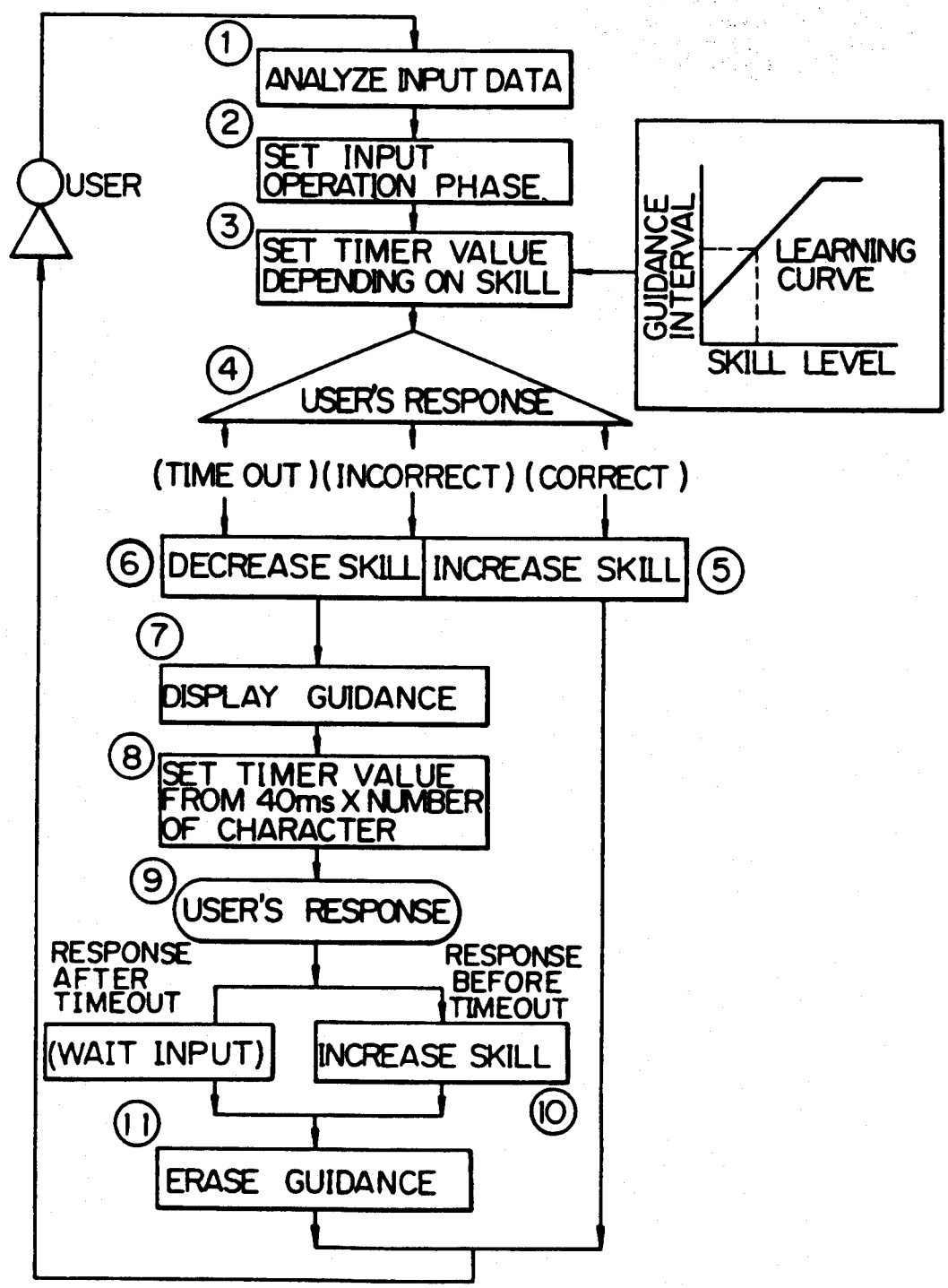
FIG. 6 is a flowchart for explaining the present invention.

FIG. 6 is a flowchart for explaining the basic execution step of the present invention.

In FIG. 6, when the user initially selects the function on the display device 2, the input analyzer 4 analyzes the input information (step 1) and the status controller 5 controls the input execution step (step 2). The timer 6 sets the time in accordance with the user's skill level determined by the skill controller 7 (step 3). For example, in FIG. 2, when the operator touches the middle drawer of the file cabinet 41 using the electric pencil 15, the tablet controller 16 transfers the ordinate data of the file cabinet 41 to the CPU 11, and the input information is analyzed by the input analyzing function of the CPU 11. The time set in accordance with the user's skill level is determined by the functions of the skill controller 7, the timer 6, and the status controller 5 in the CPU 11. The timer value corresponds to the timing of the display of the guidance messages. The relationship between the skill level and the guidance interval is shown by the learning curve in FIGS. 7 and 8. That is, the higher the skill level, the larger the timer value (guidance interval). Therefore, when the user's skill level is high, the timing of the display of the next guidance message is delayed.

In step 4, the CPU 11 waits for a response from the user. When a correct operation is performed within the timer value, the skill level is increased and the guidance messages are not displayed on the screen (step 5). Then as is obvious, the next operation is again started from the first step 1. When the operation time is more than the timer value, due to a time lag or incorrect operation, the skill level is decreased (step 6). In this case, the display status is shown by FIG. 5 (step 7). The timer value corresponds to the time for reading the guidance messages. The reading time also corresponds to the number of characters. For example, in the guidance messages shown in FIG. 5, assuming that the user needs about 40 milliseconds to read one character, the timer value is determined by multiplying 40 msecs by the number of characters in the guidance messages (step 8). The CPU 11 then waits for the next response from the user (step 9).

When the next input operation is performed by the operator within the above new set reading time, the skill level is newly increased based on the judgement of the CPU, since the operator did not read the guidance message shown in FIG. 5 (step 10). In this case, since the skill level was once decreased in step 6, the skill level is returned to the initial state in step 10, and the guidance message is erased after the elapse of the new set reading time required by the user to finish reading the guidance message (step 11).

As explained above, the input operation phases are repeated in accordance with the steps in FIG. 6. The timer 6 in the CPU 11 detects the time interval at every input operation phase, and therefore, when the next operation is performed before displaying the guidance message, the skill level is increased and the display timing of the next guidance message is delayed. Thus the skilled user can perform the input operation without the nuisance of waiting out the guidance messages, but the unskilled user can easily perform the input operation since the guidance message is displayed for a suitable display timing before performing the next input operation. Further, the guidance message may be erased when the next input operation is performed, or may be unconditionally erased after the predetermined time is elapsed.

Figure 7:
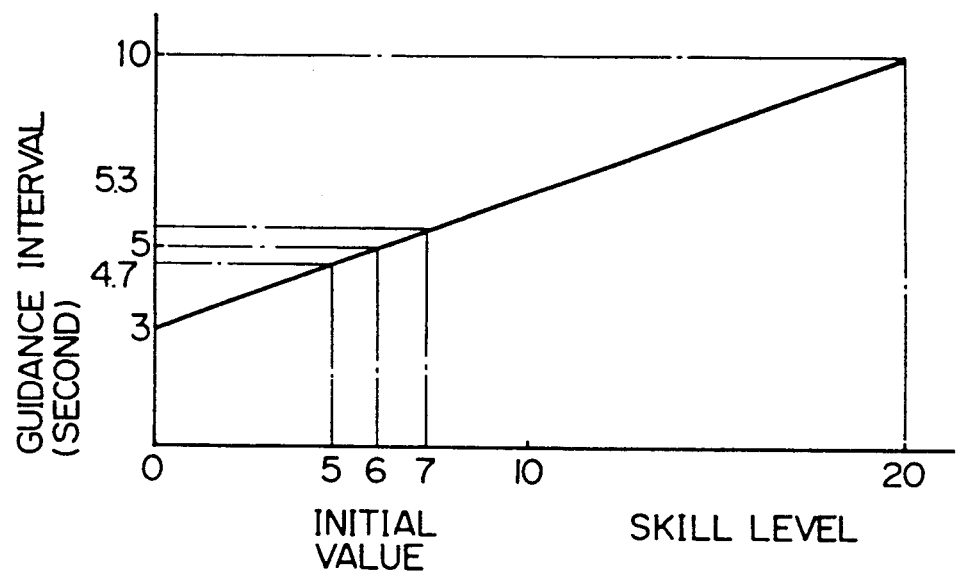
FIGS. 7 and 8 are graphs illustrating the relationship between guidance interval and skill level.
Figure 8:
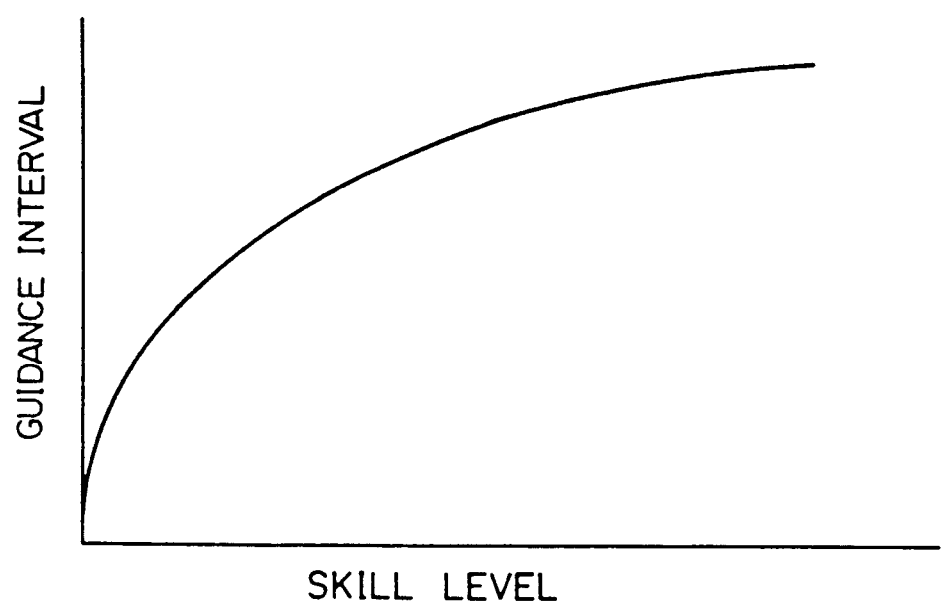

FIGS. 7 and 8 show the relationship between the guidance interval and the skill level. In FIG. 7, when the initial value of the skill level is set to the value "6", the timer value of the guidance interval becomes five seconds, i.e., the timer value in step 3 is set to five seconds. The skill level is decreased to the value "5" in step 6, and the timer value is changed to 4.7 seconds. The minimum guidance interval is three seconds. When the skill level is set to the value "7" in step 5, the timer value becomes 5.3 seconds. Further, when the skill level is set to the value "20", the timer value becomes 10 seconds, but when the skill level exceeds the value "20", the timer value is always set to 10 seconds. As explained above, the learning curve is straight in FIG. 7, but since the skill level is exponentially increased in the initial stage, the learning curve can be expressed by the exponential curve as shown in FIG. 8. This curve shows the actual state of the skill level. In this case, the timer value can be calculated from the general formula of the exponential curve.

Figure 9A:
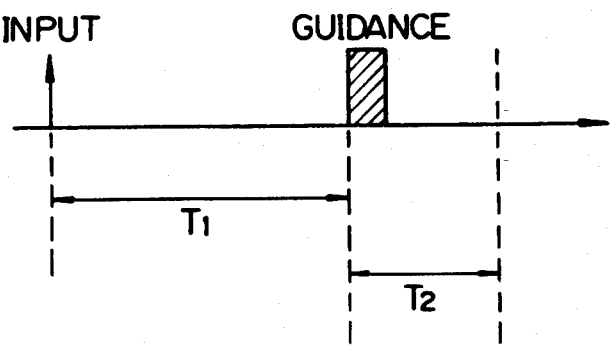
FIGS. 9A to 9C are timing charts for explaining the guidance interval.
Figure 9B:
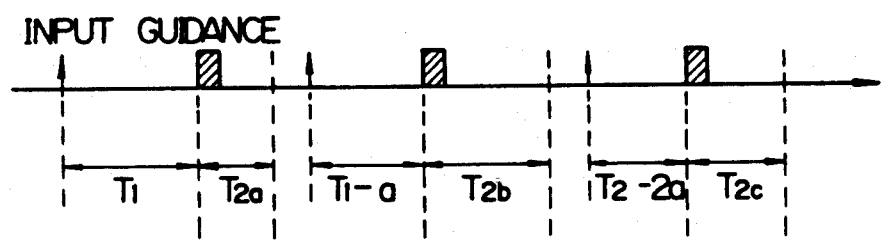
Figure 9C:
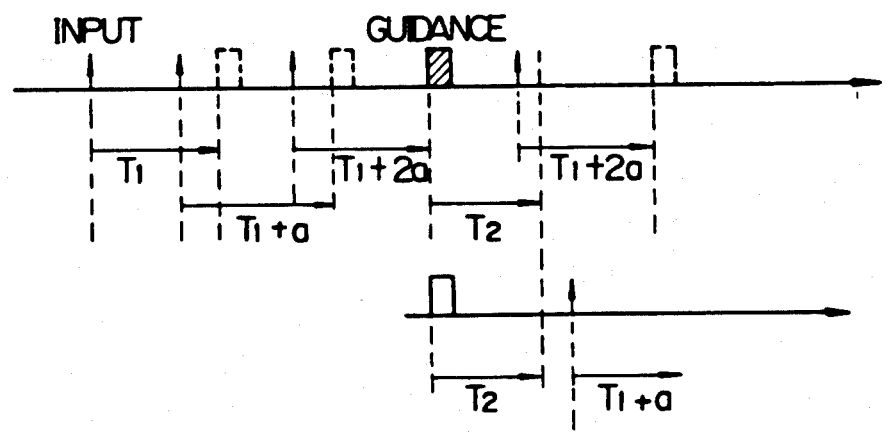

FIGS. 9A to 9C are timing charts for explaining the guidance interval, wherein ($T_1$, $T_2$, $T_{1+a}$, $T_{1-a}$, $T_{1+2a}$ —) denote the guidance intervals. The timing charts of FIGS. 9A and 9B, show normal patterns in the case of an unskilled user. Namely, the guidance message is displayed after each input operation (key-in). As shown in the chart, the guidance interval becomes gradually shorter with each operation. The timing chart of FIG. 9C shows the case of a skilled user. In this case, the display of the guidance message is delayed, since the user can perform the next operation without the guidance message.

Figure 10:
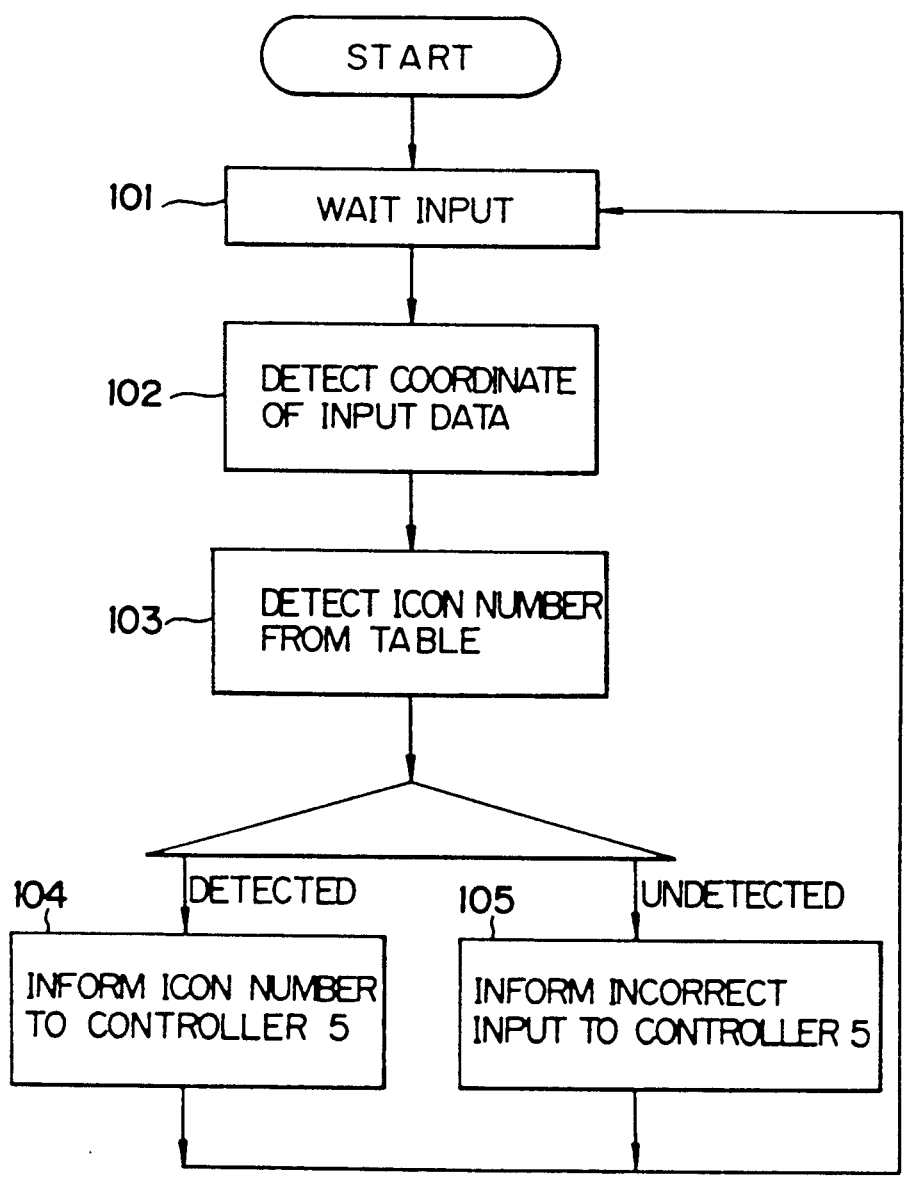
FIG. 10 is a flowchart for explaining the operation of the input analyzer in FIG. 1.

FIG. 10 shows a flowchart for explaining the operation of the input analyzer 4 in FIG. 1, and FIG. 11 shows a coordinate table stored in the main memory 24 for controlling the input data. In FIG. 10, the input analyzer 4 waits for the information input from the input unit 1 (step 101). When the information is input by the operator from the keyboard (key-in), the input analyzer 4 obtains the coordinate of the input information (step 102), and detects the icon number (I) selected from the table shown in FIG. 11 based on the input coordinate (X, Y) and the present status number (S) (step 103). When the input analyzer 4 detects the icon number, the selected icon number is sent to the status controller 5

(step 104). When the input analyzer 4 does not detect the icon number, the status controller 5 is informed of an incorrect input operation (step 105). In FIG. 11, H ($H_0$, $H_0'$ —) shows the ordinate and W ($W_0$, $W_0'$ —) shows the abscissa.

Figure 12B:
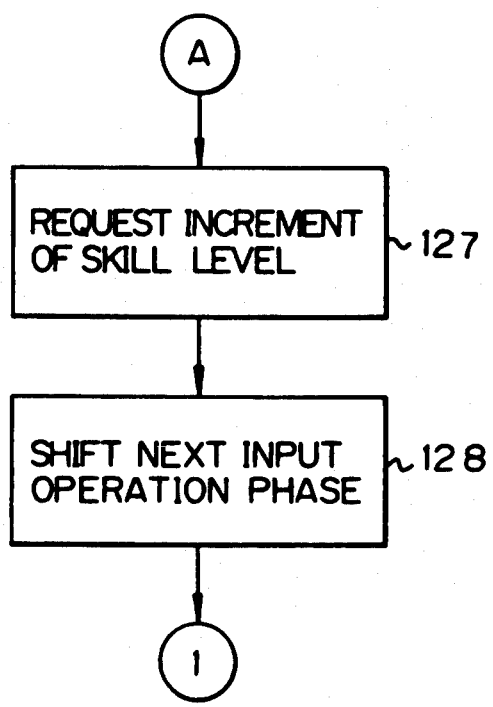
Figure 12C:
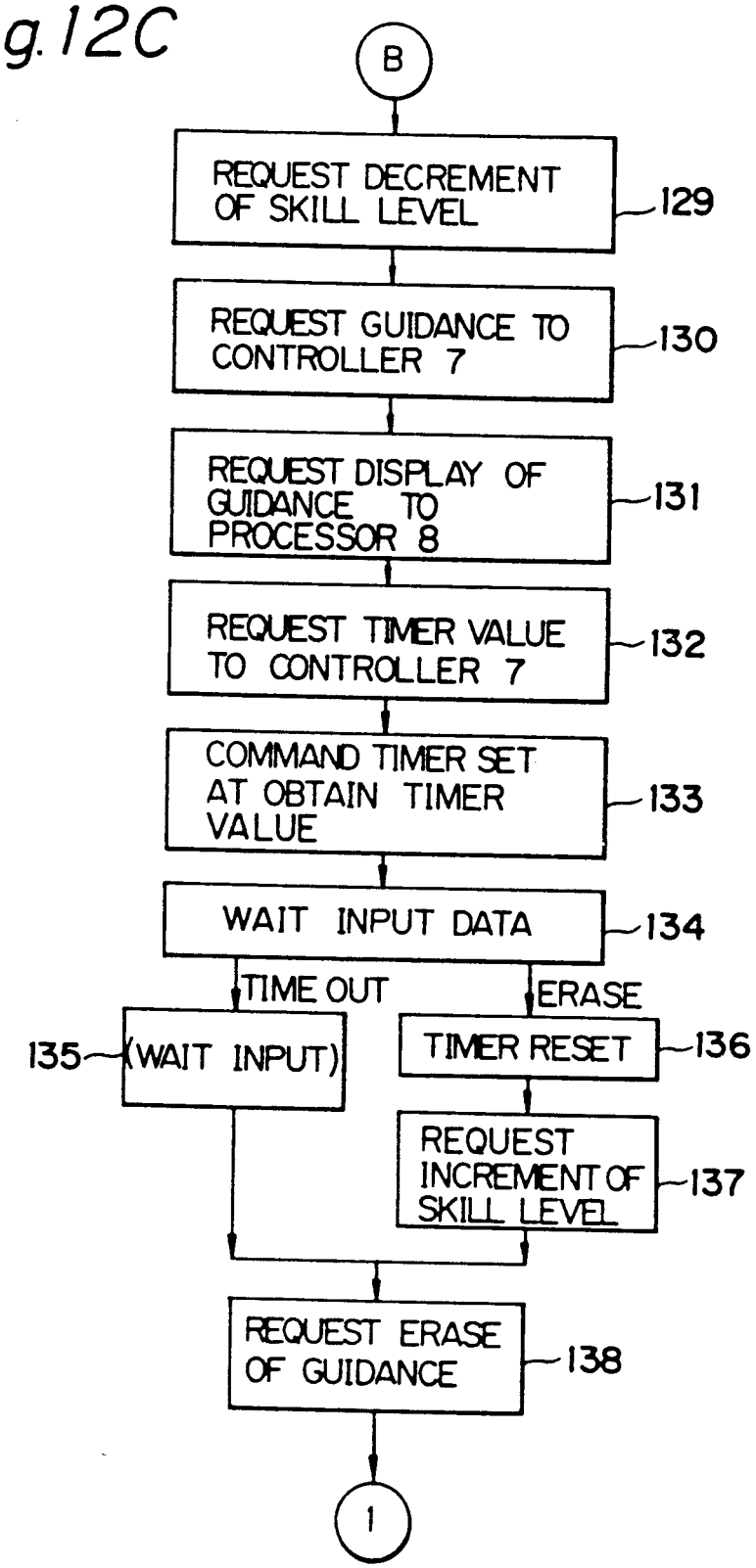

FIGS. 12A to 12C show flowcharts for explaining the operation of the status controller 5 in FIG. 1. In FIG. 12A, it is assumed that the present status number $S_i$ is given by $S_0$ (step 121), and the status controller 5 requests the timer value before displaying the guidance message to the skill controller 7 (step 122). The controller 5 commands the setting of the timer value given by the controller 7 to the timer 6 (step 123), and the status controller 5 then waits for the data input, i.e., the user's response (step 124), and determines whether it is "correct", "incorrect", or a "time out" operation. The timer 6 is reset based on the determination of these data (steps 125, 126).

In FIG. 12B, in the case of a correct operation, the status controller 5 sends a request for an increment of the skill level to the skill controller 7 (step 127) and then shifts to the next operation phase based on the status number and icon number having a corresponding running application and a next status from stored in the table shown in FIG. 13 (step 128). Note, the table shown in FIG. 13 is therefore the status control table used in the status controller 5.

In FIG. 12C, in the case of an incorrect or time out operation, the status controller 5 sends a request for a decrement of the skill level and retiming of the guidance messages to the skill controller 7 (steps 129, 130). Further, the status controller 5 sends a request for a display of the guidance message to the display processor 8 (step 131) and sends a request for the timer value corresponding to the guidance message now displayed to the skill controller 7 (step 132), and then resets the timer 6 based on the timer value given by the skill controller 7 (step 133). The status controller 5 then waits for the data input, i.e., the user's response (step 134). When informed of a time out by the timer 6, the status controller 5 waits for the data input and a request for an erasure of the guidance message is sent from the input analyzer 4 (step 135). Further, the guidance message may be erased in this time out even if the user's response is not performed. When the request for erasure of the guidance message is sent from the input analyzer 4 in step 134, the status controller 5 sends a request for an increment of the skill level to the skill controller 7 (step 137), after resetting the timer (step 136). Further, the status controller 5 sends a request for an erasure of the guidance message to the display processor 8 (step 138). The table shown in FIG. 13 is the status control table stored in the main memory 24. The running application A ($A_0$, $A_1$ —) denotes, for example, the application phase for processing the contents of the drawer. The next status numbers . $S_{n0}$, $S_{n1}$, —) correspond to the status number ($S_0$, $S_1$, —).

Figure 14:
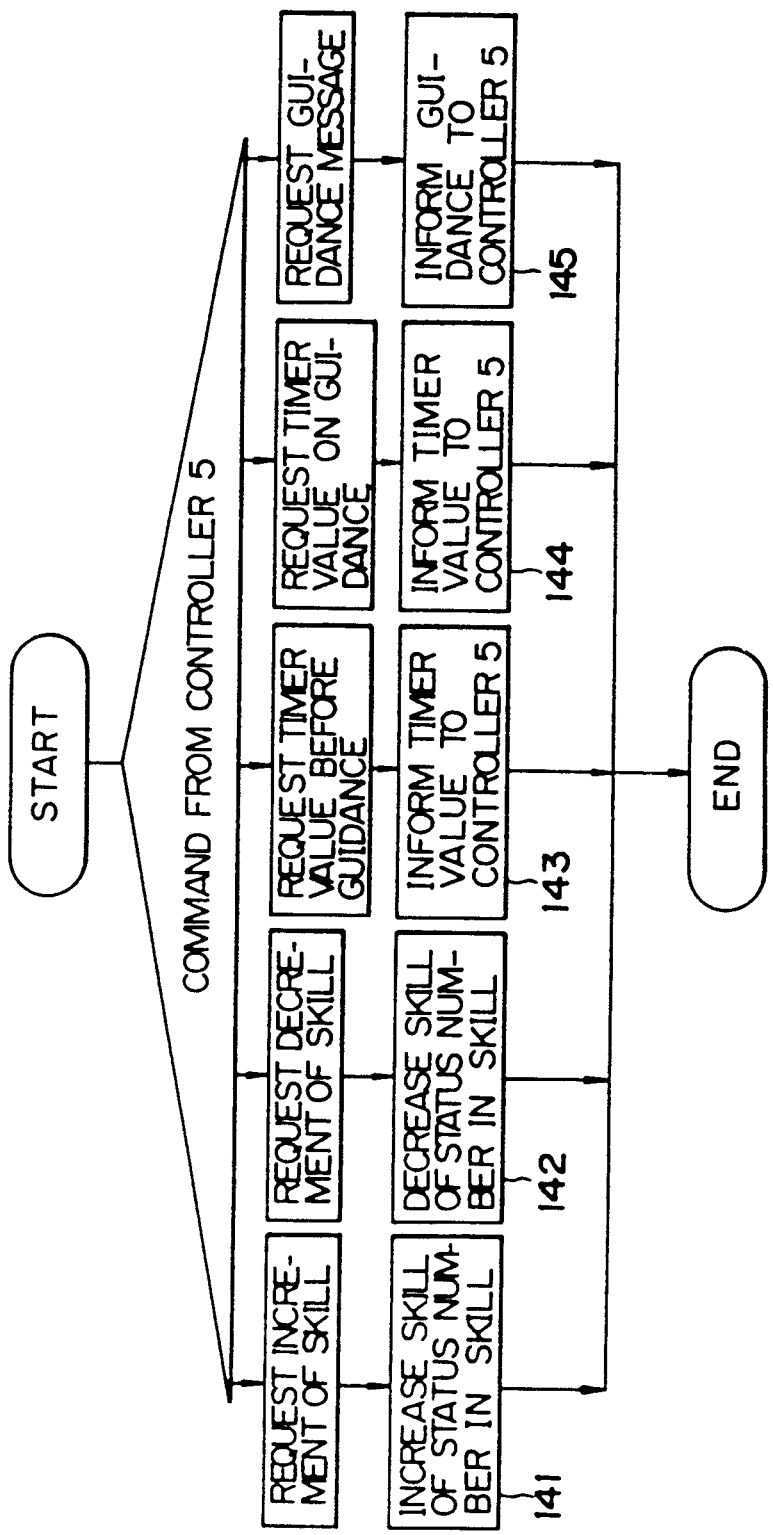
FIG. 14 is a flowchart for explaining the operation of the skill controller in FIG. 1.

FIG. 14 shows a flowchart for explaining the operation of the skill controller 7. All operations in the skill controller 7 are based on commands from the status controller 5, in accordance with the skill control table shown in FIG. 15. The skill control table is stored in the main memory 24. When the controller 5 requests an increment of the skill level, the skill level $S_k$ of the status number $S_i$ in the table is increased by one (step 141), and when the controller 5 requests a decrement of the skill level, the skill level of the status number in the table is decreased by one (step 142). When the controller 5 requests the timer value before displaying the guidance message, the skill controller 7 detects the timer value from the skill level of the status number in the table and the learning curve, and sends same to the status controller 5 (step 143). When the controller 5 requests the timer value when displaying the guidance message, the skill controller 7 detects the timer value from the formula (total number of characters $\times$ 40 milliseconds) at the status number $S_i$ in the table, and sends same to the status controller 5 (step 144). When the controller 5 requests a guidance message, the skill controller 7 sends the guidance message at the status number $S_i$ in the table to the status controller 5 (step 145). In FIG. 15, the learning curve is given by, for example, $ax + b$, as shown in FIG. 7. Further the number of characters ($g_0$, $g_1$ —) is given by the number of characters $\times$ 40 ms.

The present invention has been described referred to a preferred embodiment, however, the present invention permits various modifications within the scope of the subject matter of the present invention. Since numerous modifications and changes will readily occur to those skilled in the art, it is not desired to limit the invention to the exact construction and applications shown and described and accordingly, all suitable modifications and equivalents may be resorted to, falling within the scope of the invention and the appended claims and their equivalents.

What is claimed is:

1. A display control unit of a guidance message display control system in terminal equipment for displaying a guidance message, the guidance message display control system also including an input unit, a display unit and a storage memory containing coordinate and status control tables, said display control unit comprising:

input data analyzing means, operatively connected to the input unit, for analyzing input data corresponding to an input operation based on the coordinate control table stored in the storage memory;

status control means, operatively connected to said input data analyzing means, for controlling display timing of the display unit based on the status control table stored in the storage memory;

timer means, operatively connected to said status control means, for counting an elapsed time and for setting a guidance display interval at every input operation, the guidance display interval corresponding to a skill level;

skill control means, operatively connected to said status control means, for controlling the skill level by increasing or decreasing the skill level at each input operation based on the elapsed time, the guidance display interval and correctness of the input operation, through a skill control table stored in the storage memory; and display control means, operatively connected between said status control means and the display unit, for controlling a display status of the guidance message on the display unit, wherein said status control means sends a request for the guidance display interval, prior to displaying the guidance message, to said skill control means, sends a command to set the guidance display interval given by said skill control means to said timer means, sends a request for an increment of the skill level to said skill control means when the input operation is correct, and sends a request for a decrement of the skill level to said skill control means when the input operation is incorrect.

2. A display control unit as claimed in claim 1, wherein said skill control means increases the skill level based on the skill control table when receiving an increment request, decreases the skill level based on the skill control table when receiving a decrement request, informs said status control means of a first guidance display interval based on said skill control means when receiving the request for the guidance display interval prior to displaying the guidance message, informs said status control means of a second guidance display interval when receiving a request for the guidance message on the display, and informs said status control means of the guidance message when receiving the request for the guidance message.

3. A display control unit as claimed in claim 2, wherein the first guidance display interval is determined based upon a learning curve and the skill level in the skill control table.

4. A display control unit as claimed in claim 2, wherein the second guidance display interval is determined by multiplying a time for reading one character by a number of characters displayed.

5. A display control unit as claimed in claim 2, wherein the control of the display timing in said status control means and said display control means is performed for the same guidance message.

6. A display control unit as claimed in claim 2, wherein the control of the display timing in said status control means and said display control means is performed for different guidance messages in accordance with the display status of the display unit.

7. A display control unit as claimed in claim 1, wherein said timer means comprises
a first timer, having a set time, for counting a key-in time elapsed from a key-in operation; and
a second timer, having a set time, for counting a read time from the display of the guidance message until a next key-in operation, and
wherein the display timing of the guidance message is adjusted by controlling the set time of said first timer in response to the key-in time elapsed from the key-in operation, and the display timing of a next guidance message is adjusted by controlling the set time of said first timer in response to the read time elapsed from the display of the guidance message until the next key-in operation.

8. A display control unit as claimed in claim 7, wherein said first timer counts the time elapsed between key-in operations, when the time elapsed reaches the guidance display interval, said display control means commands the display of the guidance message, said first timer sets the guidance display interval for a next display of the guidance message as smaller than the guidance display interval previously set, and said second timer sets the time interval from the key-in operation until a guidance message display as shorter than the time elapsed.

9. A display control unit as claimed in claim 7, wherein the guidance display interval of said first timer is set to a larger value when the next key-in operation is performed before the count in said first timer is finished, and the guidance display interval from the next key-in operation to the guidance message display is made shorter.

10. A display control unit as claimed in claim 7, wherein the guidance display interval of said first timer is set to a large value when the key-in operation is performed before the count of the read time by said second timer reaches a predetermined value after the display of the guidance message, and the guidance display interval for the next key-in operation to the display of the guidance message remains the same as before the key-in operation.

11. A display control unit as claimed in claim 7, wherein the display timing is set faster when the key-in operation is performed after a count of the predetermined value in said second timer is completed.

12. A display control unit as claimed in claim 7, wherein said first and second timers are set at every input operation, and the display of each guidance message is controlled by a corresponding said first and second timer.

13. A display control unit as claimed in claim 7, wherein said second timer counts a time determined by a number of characters displayed on the display unit.

14. A display control unit as claimed in claim 7, wherein the guidance message is displayed when said second timer finishes a count of the timer value.

15. A display control unit as claimed in claim 7, wherein the guidance message is erased when a key-in operation is performed after displaying the guidance message.

* * * * *